Patented May 8, 1951

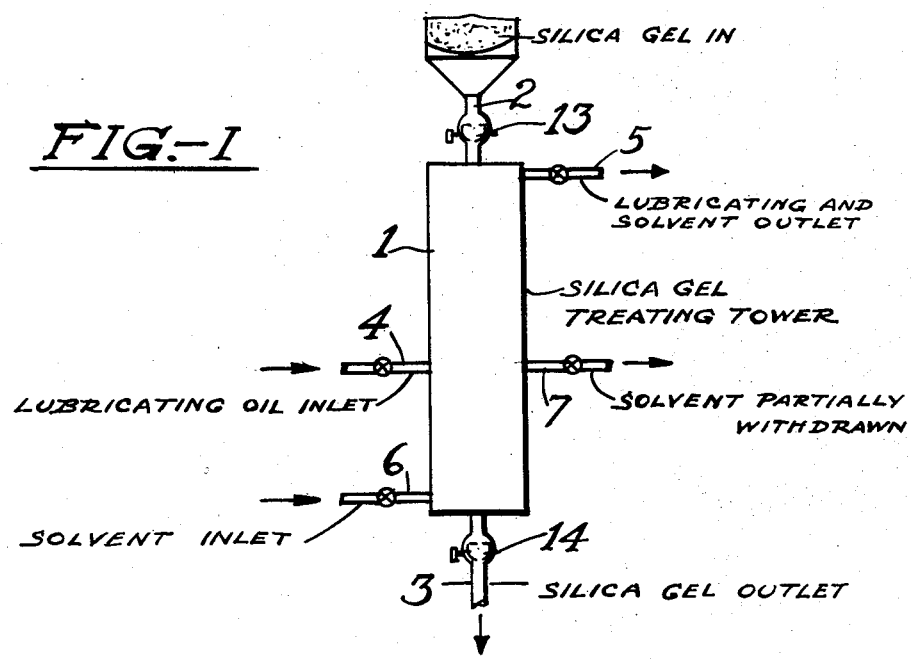
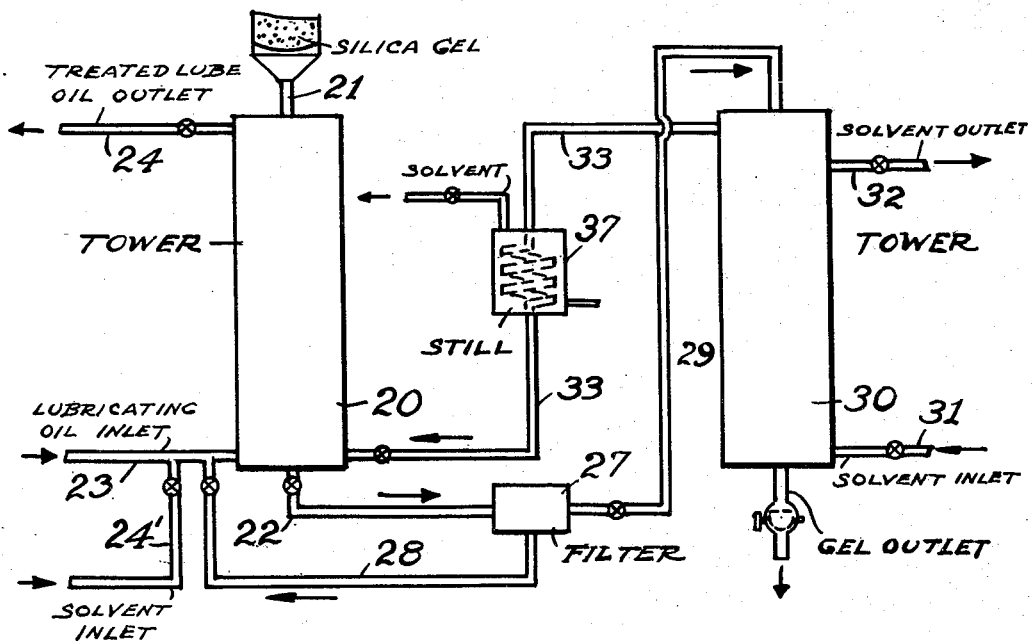

2,552,436

UNITED STATES PATENT OFFICE 2,552,436

PROCESS FOR TREATING LUBRICATING OIL WITH SOLID ADSORBENTS

George A. Bennett, Center Moriches, N. Y., and Stephen F. Perry, Roselle, N. J., assignors to Standard Oil Development Company, a corporation of Delaware Application December 9, 1947, Serial No. 790,542

6 Claims. (Cl. 196—147)

This invention relates to a process and apparatus for treating fluids with solid adsorbents. The invention particularly relates to the treatment of lube oil stocks with silica gel to improve the viscosity index of the lubricating oil. In accordance with the present invention, a critical amount of solvent is employed as a diluting and washing agent for the lube oil-silica gel treatment to get a maximum improvement in the viscosity index of the lubricating oil.

It is known to the art that the viscosity index of lubricating oils may be improved by treatment with a suitable solid adsorbent. For this purpose a wide variety of adsorbent materials may be used. For example, adsorbent charcoal; adsorbent clay; fuller's earth; bentonite; silica gel, or alumina may be employed. However, it is generally recognized that the adsorbent properties of silica gel qualify it as one of the most sfficient adsorbents for this purpose. The present invention is therefore described particularly as it relates to the use of silica gel.

Various procedures have been developed suitable for treating a lubricating oil with silica gel. The treatment may be carried out batchwise, or continuously. In general it has been found desirable to add a solvent to the lubricating oil in sufficient quantities to serve as a diluent in order to alter the viscosity of the lubricating oil sufficiently to enable better contact with the silica gel. A variety of solvents may be employed. In general any solvent of a non-aromatic nature is suitable, such as an aromatic free petroleum fraction within the gasoline boiling range, normal heptane, pentane, or other light paraffins, naphthenes, a paraffin-naphthene mixture such as a light virgin naphtha fraction or an alkylate fraction. It has now been discovered that a critical amount of solvent should be employed to secure the maximum improvement in the viscosity index of the oil being treated.

The improvement in viscosity index of a lubricating oil, caused by treatment with silica gel, is believed to be due to the selective adsorption by the silica gel of certain constituents of the lubricating oils, in particular the aromatics. Consequently, the solvent employed in treating a lube oil in reality serves two purposes. The first, as stated, is to suitably dilute the lubricating oil, and the second is to serve as a washing agent to partially desorb constituents from the silica gel, thus improving the selectivity of adsorption attained. It has now been discovered that for a given adsorbent treat, and for a given quantity of total solvent, the smallest possible quantity of solvent which will give a stirrable mixture of gel, oil and diluent is preferably employed during initial contacting, while a further quantity of solvent should preferably be employed subsequently as a washing agent. By employing the minimum amount of solvent as a diluent, followed by the initial separation of treated oil and further treatment of the silica gel with more solvent, the greatest improvement in the viscosity index of lubricating oils is attained.

The data of Table I shows the effect on which our invention is based. The table shows the improvement in viscosity index which is obtained for a given treat, using a given amount of solvent, n-heptane, in the case where the solvent is added as a diluent only and in the case where solvent is added both as a diluent and as a washing agent. The oil treated was a dewaxed Panhandle lube distillate having an initial viscosity index of 78.

Table I

| Treat, Wt. Per Cent | Total Vol. Per Cent Solvent | Product V. I. (When Solvent is Added as Diluent Only) | Product V. I. (When Solvent is Added as Diluent and Wash) |
|---|---|---|---|
| 220 | 420 | 101 | 107 |
| 440 | 1,000 | 104 | 107 |
| 660 | 1,200 | 108 | 111 |

The data show that with a 220 wt. per cent treat, that is using 2.2 times as much silica gel as lubricating oil being treated, a viscosity index of 107 may be obtained when using a total of 420% solvent partly as initial diluent and partly as supplementary wash. However, when using the entire 420% solvent as diluent, a viscosity index of only 101 was obtained; the comparative improvement for the diluent wash process being 6 points. Similarly at 440 wt. per cent and 660 wt. per cent gel treats an increase of 3 points in viscosity index is shown when employing a part of the solvent as a washing agent rather than all of the solvent as a diluent. In the tests listed in Table I, when solvent was employed as a wash as well as a diluent, the minimum quantity of solvent was employed which would have the effect of producing a stirrable mixture. The remainder of the solvent was then used as a washing agent. The data presented lead to the conclusion that aromatics adsorbed by silica gel are not readily displaced by normal heptane wash when this wash is applied after initial separation of the treated lubricating oil. However, in the presence of both normal heptane and all the lube components a greater solvent action is exerted on the adsorbed aromatics. It is apparent, therefore, that an optimum method of operation consists of; first, contacting the silica gel with lubricating oil which has been diluted with the minimum amount of solvent necessary for formation of a suitable slurry; second, the most complete possible separation of unadsorbed oil from the gel; and third, washing of the gel with additional solvent.

Our invention relates to a process and apparatus whereby the optimum conditions stated may be attained in the treatment of lubricating oil with silica gel. The objects and advantages of our invention will be fully appreciated from the following description, together with the accompanying drawings in which:

Figure 1 diagrammatically represents a single vessel adaptation of our invention, and Figure 2 represents a two vessel embodiment of our invention.

It is preferred to carry out the process of our invention continuously. One embodiment of a continuous process is shown in Figure 1. In this figure, the numeral 1 designates a vertical treating tower. At the top of tower 1, silica gel is introduced through line 2 by means of a star feeder, basket valve 13, or other suitable means for introducing solids into a liquid system. The silica gel introduced at the top of the tower falls downwardly through the tower and is withdrawn at the bottom of the tower through line 3 by means of a basket valve 14, or other suitable means. Lubricating oil to be treated is introduced through line 4 midway up the tower and flows upwardly through the tower countercurrent to the downward flow of the silica gel. The treated lubricating oil may be withdrawn at the top of the tower through line 5. In accordance with the present invention, a suitable solvent is introduced through line 6 at the bottom of the tower. This solvent flows upwardly through the tower and is partially withdrawn midway up the tower through line 7. The remainder of the solvent not withdrawn through line 7 proceeds upwardly through the tower being removed together with the treated lubricating oil. In order to suitably improve the viscosity index of lubricating oils, in general, about 220 wt. per cent to 660 wt. per cent treat, that is weight of gel based on lube oil treated, should be employed. Expressing this figure in a different manner an oil to gel ratio in the range of about 0.5 to 0.2 cc. of lubricating oil per gram of gel should be used. While the exact value depends to some extent on the particular gel size used, the minimum liquid to gel ratio which produces a stirrable slurry is generally about 1.0 to 1.5 cc. per gram. More precisely, the ratio preferred is about 1.2 to 1.4 cc. per gram. For example, in the case of 28 to 200 mesh gel, about 1.3 ccs. of liquid are required per gram of gel to produce a stirrable slurry. In accordance with this invention, therefore, sufficient solvent should be present during treating of the lubricating oil to produce a liquid to gel ratio in the above range. To secure effective washing of desirable lube components from silica gel requires about 1 to 1.5 cc. of wash per gram of silica gel. Applying these critical figures to the operation of the tower shown in Figure 1, sufficient lubricating oil will be introduced through line 4 relative to silica gel introduced through line 2 so that a ratio of oil to gel of about 0.5 to 0.2 ccs. of lube per gram of gel will be obtained. Sufficient solvent will be introduced through line 6 so that about 1 to 1.5 ccs. of wash will be provided per gram of silica gel. Sufficient solvent will be withdrawn through line 7 so that the solvent and desorbed lube components proceeding upwardly through the tower together with the fresh lubricating oil will provide a liquid to gel ratio of about 1.0 to 1.5 ccs. per gram.

As described, the embodiment of Figure 1 will be observed to comprise 2 treating zones; a lower treating zone having a high ratio of solvent to silica gel operating as a wash zone, and an upper zone in which the liquid present is the minimum which will provide a stirrable slurry operating as a primary contacting zone of the lubricating oil and silica gel. In the upper part of the tower, therefore, silica gel is contacted with lubricating oil which has been diluted with the minimum amount of solvent necessary for formation of a stirrable slurry selectively adsorbing constituents of the lubricating oil. As the silica gel falls downwardly through the tower, it passes the inlet 4 through which lubricating oil is introduced so that silica gel passing this point of the tower, is partially separated from unadsorbed oil. This silica gel falling into the lower part of the tower is then washed with the additional solvent, circulating in the lower part of the tower through lines 6 and 7.

The washing action which occurs in the lower part of the tower has the effect of washing, or desorbing from the silica gel, constituents of the lube oils which have been adsorbed by the gel. These constituents will tend to rise upwardly in the tower forming a layer above the point at which the solvent is withdrawn, that is above line 7. The presence of these desorbed constituents of the lubricating oil has the effect of increasing the selectivity with which the silica gel removes the constituents of the lubricating oil.

In order to secure a better separation of unadsorbed oil from silica gel it is desirable to use a two step treating process, rather than the single tower of Figure 1. Such a two step process is illustrated in Figure 2. Referring to Figure 2, the first step of the process is carried out in tower 20. Silica gel is introduced at the top of tower 20 through line 21 employing suitable solid to liquid valves. The silica gel passes downwardly through the tower and is removed at the bottom through line 22. Lubricating oil is introduced at the bottom of the tower through line 23 and flows upwardly through the tower to be removed through line 24. The lubricating oil introduced through line 23 is suitably diluted with a solvent introduced through line 24'. The quantity of solvent employed, together with the amount of lube oil relative to the amount of silica gel, is such that the liquid to gel ratio is the minimum at which a stirrable slurry exists. The silica gel removed from the bottom of the tower through line 22 is separated as completely as possible into oil and gel components in filter, or equivalent means 27. The oil separated may be recycled to treating tower 20 by means of line 28. The silica gel freed of entrained oil is then transferred through line 29 to treating zone 30. The silica gel may be introduced to tower 30 at the top of the tower, and may be allowed to fall downwardly through the tower as in tower 20. A critical amount of wash solvent is introduced at the bottom of the tower through line 31 and flows upwardly through the tower to be removed through line 32. A portion of the solvent removed through line 32 may be used as the solvent introduced to tower 20 through line 24. Constituents of the lube oil desorbed from the silica gel in the wash zone are withdrawn from the top of tower 30, through line 33, are stripped of solvent in still 37, and are returned to tower 20 at the bottom of the tower. The relative proportions of lube oil, silica gel, wash solvent and diluent solvent are adjusted as indicated in connection with Figure 1. It is apparent that the two step process of Figure 2, is thus equivalent to the embodiment of Figure 1, with the provision of filtering or equivalent means to secure the optimum separation of unadsorbed oil from the silica gel prior to washing of the silica gel.

Any suitable vessels may be employed as the treating zones in the embodiments heretofore described. It is preferred that agitation of the silica gel slurry be obtained by mechanical stirrers, or by the introduction of the diluted lube oil through suitable feed jets. Baffles or other devices for improving or regulating the countercurrent flow may be used. Other engineering refinements known to the art may be employed in these towers. It should also be understood that a plurality of vessels arranged in series could be substituted for either or both of the vessels described in Figure 2.

The washed silica gel as obtained from the process described may be further regenerated by additional washing with suitable solvents, by steaming or gas purging at high temperatures, or by controlled combustion. Silica gel regenerated by these methods may then be reintroduced to the treating zones. Similarly solvent which has been employed in the process described may be purified by distillation and may be recycled in the process.

The improved selectivity using the minimum dilution, separation by filtration, and wash procedure illustrated in Figure 2, is demonstrated by the data given in Table II. A series of runs were made in which the dilution was varied in order to vary the yield obtained, to permit a comparison at equal yields of the procedure in which all solvent used was employed as a diluent and the procedure in which part of the solvent was employed as a wash. The solvent used was n-heptane and the oil treated was dewaxed Panhandle lube distillate having an initial viscosity index of 78.

*Table II*

| Comparison at— | Dilution Only | | Minimum Dilution+Wash | |
|---|---|---|---|---|
| | V. I. | Solvent Requirements[1] | V. I. | Total Solvent Requirements |
| 220 Wt. per cent treat, 52% yield | 103 | 300 | 107 | 420 |
| 440 Wt. per cent treat, 58% yield | 106 | 770 | 107 | 1,000 |
| 660 Wt. per cent treat, 48% yield | 109 | 950 | 111 | 1,200 |

[1] Vol. per cent based on lube.

It may be observed from Table II that for a 220 wt. per cent treat, for example, in obtaining a 52% yield, 300 wt. per cent solvent is required when all of the solvent is employed as a diluent, while 420 wt. per cent solvent is required when that portion of the solvent above the quantity required to get a slurry is employed as a wash. These figures indicate that for a given yield of treated lube oil a greater quantity of solvent is required when a part of the solvent is employed as a wash. It must be remembered however that part of the solvent employed as wash may be reused as diluent without the necessity of intermediate distillation. Therefore, the higher total solvent requirement shown for the minimum dilution plus wash technique, is actually lower in terms of stripping requirements and constitutes an advantage of this process.

As described, this invention comprises the optimum manner of utilizing a given quantity of solvent for a given silica gel-lube oil treat. In accordance with the present invention, only sufficient solvent is employed in the initial silica gel-lube oil contacting to provide a slurry of the lubricating oil. After an initial separation of unadsorbed lube components the remainder of the solvent is then employed as a wash. This procedure allows the silica gel to exert increased selectivity with the result that a greater improvement in the viscosity index of lubricating oils may be attained.

Having now described this invention, what is claimed is:

1. A process for treating lubricating oils with silica gel in a vertical treating zone in which silica gel is introduced at the top of said zone and drops downwardly through the zone to be withdrawn at the bottom, lubricating oil is introduced midway up the zone, flows upwardly through the zone to be withdrawn at the top, the ratio of lubricating oil to silica gel in the zone being in the range of about 0.2 to 0.5 ccs. per gram, from 1.0 to 1.5 ccs. of a low molecular weight paraffinic hydrocarbon liquid per gram of silica gel is introduced at the bottom of the zone, flows upwardly through the zone and is partially withdrawn midway up the zone, the remainder being withdrawn at the top of the zone, whereby the total amount of liquid remaining in the upper portion of the zone is that quantity required to form a stirrable slurry with the silica gel falling in the range of about 1.0 to 1.5 ccs. per gram.

2. The process defined by claim 1 in which the said paraffinic hydrocarbon liquid employed is an alkylate fraction.

3. The process defined by claim 1 in which the said paraffinic hydrocarbon liquid employed is an aromatic-free petroleum fraction boiling within the gasoline boiling range.

4. A two step process for treating lubricating oils with silica gel comprising a first step in which the silica gel is contacted with lubricating oil which is diluted with a low molecular weight paraffinic hydrocarbon liquid present in sufficient quantities to form a stirrable slurry, the ratio of the lubricating oil to silica gel being about 0.2 to 0.5 ccs. per gram, and the ratio of the total liquid to silica gel being about 1.0 to 1.5 ccs. per gram, silica gel being removed from the first step, filtered and introduced to the second step in which the silica gel is washed with about 1.0 to 1.5 ccs. per gram of a low molecular weight paraffinic hydrocarbon liquid of the composition employed in the first step whereby constituents are desorbed from the silica gel, withdrawing said desorbed constituents and recycling them to the first step of the process.

5. The process defined by claim 4 in which the said paraffinic hydrocarbon liquid employed is an alkylate fraction.

6. The process defined by claim 4 in which the said paraffinic hydrocarbon liquid employed is an aromatic-free petroleum fraction boiling within the gasoline boiling range.

GEORGE A. BENNETT.
STEPHEN F. PERRY.

REFERENCES CITED

The following references are of record in the file of this patent:

UNITED STATES PATENTS

| Number | Name | Date |
|---|---|---|
| 2,384,311 | Kearby | Sept. 4, 1945 |
| 2,395,491 | Mavity | Feb. 26, 1946 |
| 2,398,101 | Lipkin | Apr. 9, 1946 |
| 2,415,315 | Walter et al. | Feb. 4, 1947 |
| 2,441,572 | Hirschler et al. | May 18, 1948 |
| 2,449,402 | Lipkin et al. | Sept. 14, 1948 |
| 2,464,311 | Hiatt et al. | Mar. 15, 1949 |